Dec. 19, 1922.

G. E. KNIGHT.
AUTOMOBILE STEERING WHEEL LOCK.
FILED DEC. 27, 1919.

WITNESS
R. A. Balderson

INVENTOR
George E. Knight,
Bakewell, Byrnes & Parmelee,
his attys.

Dec. 19, 1922.

G. E. KNIGHT.
AUTOMOBILE STEERING WHEEL LOCK.
FILED DEC. 27, 1919.

WITNESS

R H Balderson

INVENTOR
George E. Knight
by Bakewell Byrnes Parmelee
his attys.

Patented Dec. 19, 1922.

1,439,422

UNITED STATES PATENT OFFICE.

GEORGE E. KNIGHT, OF YOUNGSTOWN, OHIO.

AUTOMOBILE STEERING-WHEEL LOCK.

Application filed December 27, 1919. Serial No. 347,680.

*To all whom it may concern:*

Be it known that I, GEORGE E. KNIGHT, a citizen of the United States, residing at Youngstown, in the county of Mahoning and State of Ohio, have invented a new and useful Improvement in Automobile Steering-Wheel Locks, of which the following is a full, clear, and exact description.

The present invention relates broadly to permutation locks, and more particularly to locks of this type adapted to be used in connection with automobile steering wheels.

The principal object of the present invention is to provide a lock of this character adapted to directly co-operate with a slidable key in such manner that the steering wheel may be locked to the steering wheel shaft so as to rotate the same, or locked out of engagement therewith.

A further object of the invention is to provide a locking key having a plurality of inclined portions formed thereon adapted to directly engage the permutation locking disks to lock the key in different positions.

A still further object of the invention is to provide a lock of the character referred to which may be applied to steering posts having controlling rods passing therethrough without interfering with the operation of said rods.

The foregoing and other objects, together with their attendant advantages, will be apparent as the invention becomes better understood by reference to the accompanying specification and drawings forming a part thereof, it being premised that changes may be made in the various details and the manner of operation within the scope of the appended claims without departing from the spirit of the invention.

Figures 3 to 8, inclusive, are detail views of the permutation disks.

Figure 9:
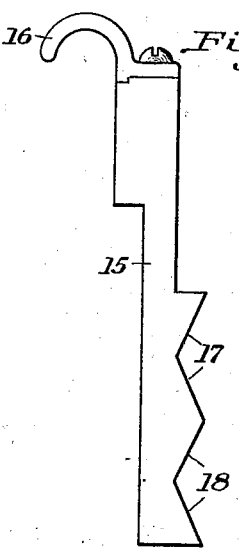

Figure 9 is an enlarged detail view of the slidable key, and

Figure 1:
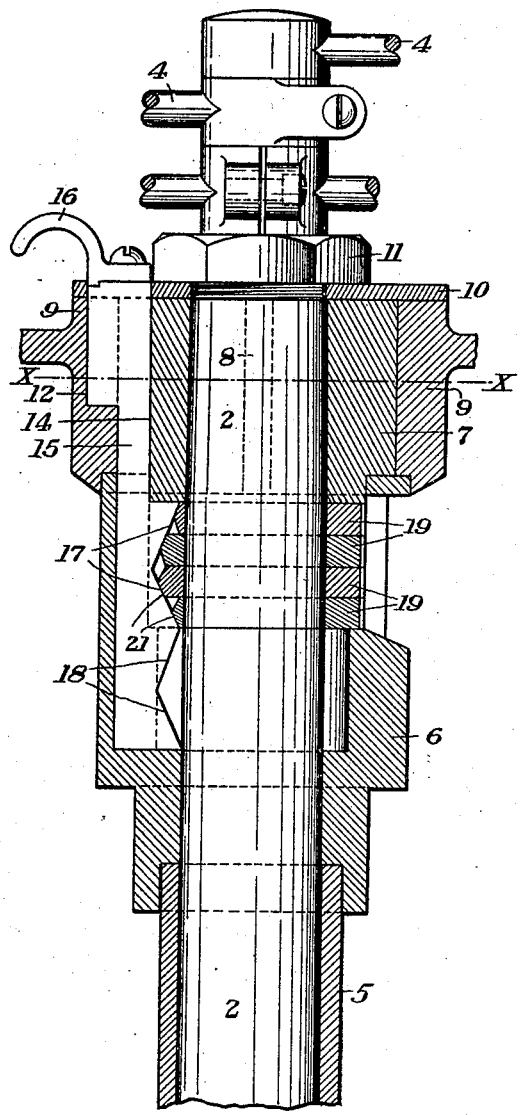
Figure 1 is a view partly in section of the upper portion of a steering post.
Figure 10:
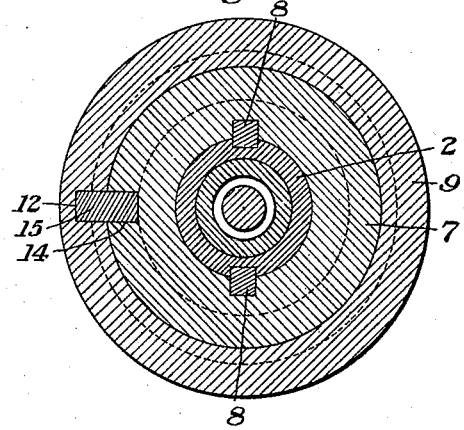

Figure 10 is a sectional view on the line X—X of Figure 1.

It is the object of the present invention to provide means not requiring the use of a key which may be applied to steering posts having controlling rods passing therethrough in such manner that the steering wheel may be locked into engagement with the steering wheel shaft so that the latter may be rotated by the wheel, or for locking the wheel out of engagement with the shaft so that turning of the wheel does not affect the position of the vehicle wheels.

By means of this invention it is possible for a driver leaving his car to prevent theft thereof by making it impossible to control the steering mechanism.

Figure 2:
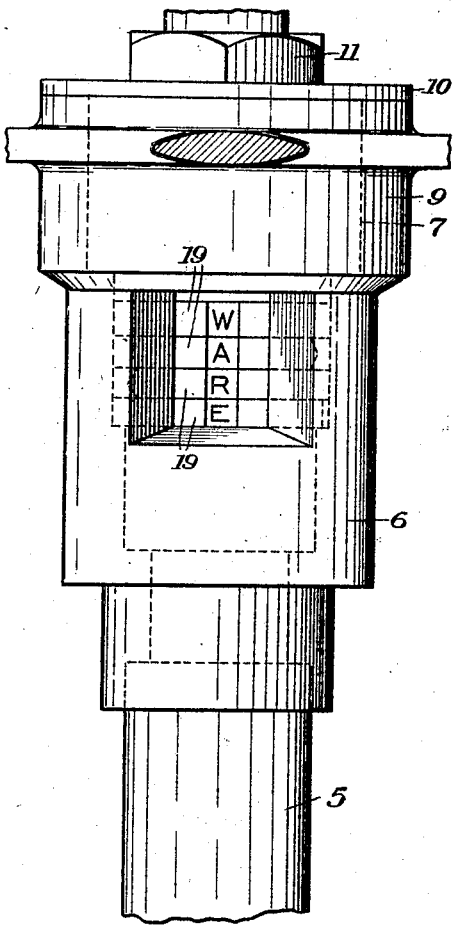
Figure 2 is a side view partly broken away of the construction illustrated in Figure 1.
Figure 3:
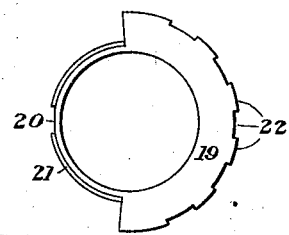
Figure 4:
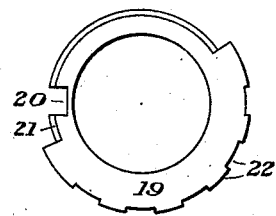
Figure 5:
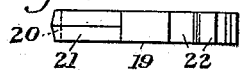
Figure 6:
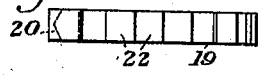
Figure 7:
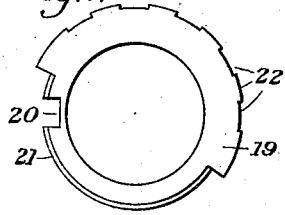
Figure 8:
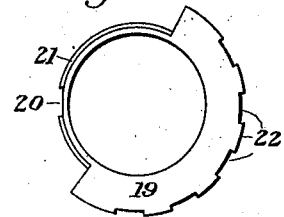

Referring more particularly to the drawings there is illustrated the upper portion of the usual steering wheel shaft 2 having an opening therethrough for the passage of the controlling rods operated by levers 4 in the usual manner. The shaft is preferably surrounded by a suitable enclosing tube 5 supporting on its upper end a casing 6. Adjacent the upper end of the shaft 2 is mounted a sleeve 7 preferably secured to the shaft by means of suitable keys 8. Surrounding the sleeve 7 is a hub 9 of the usual steering wheel. This hub is held in position about the sleeve by means of a top plate 10 secured in position by the nut 11 threaded to the shaft 2. Formed in the bearing surface of the hub 9 is a keyway 12 adapted to co-operate with a similar keyway 14 formed in the sleeve 7 to receive a vertically slidable key 15 provided with a handle 16, by means of which the key may be drawn upwardly to disengage the same from the keyway 12. At its lower end the key 15 is provided with inclined portions 17 and 18 respectively projecting varying distances from the face of the key adapted to co-operate with permutation disks 19 rotatable in the casing 6. Each of the disks 19 is provided with a peripheral notch 20, as clearly shown in Figures 3, 4, 7 and 8 adapted, when brought into vertical alignment, to permit operation of the key 15. The disks also preferably have formed about a portion of their periphery on opposite sides of the notches 20 conical surfaces 21 adapted to co-operate with the inclined portions 17 and 18, respectively, on the key, the disks being constructed of different diameters for this purpose. The remaining portion of the peripheries of each of the disks is preferably formed with alternate projecting and depressed portions 22, either or both of which may be provided with designating letters or numbers. By reference more particularly to Figure 2, it will be apparent that, with the set of disks illustrated, the letters W A R E when brought into view through the casing 6 will bring the notches 20 into vertical alignment. In this position the key 15 may be vertically lifted to disengage the same from the keyway 12, as described. In this position the steering wheel may be turned without affecting the steering wheel shaft. By turning the disks 19 at will with the key in its elevated position, they will engage the inclined portions 18 and lock the key against removal or movement into driving relation with the shaft 2.

The advantages of the present invention arise from a construction in which the steering wheel may be locked in either operative or inoperative position without requiring the use of a removable key, as may be desired.

I claim:

1. The combination with a steering wheel having a shaft, of means for locking the wheel in operative or inoperative position with relation to the shaft, said means comprising permutation locking disks and a slidable locking key having inclined portions adapted to engage the locking disks to lock the wheel in operative position, and independent inclined portions adapted to engage the locking means to lock the wheel in inoperative position, substantially as described.

2. A locking means of the character described, comprising permutation disks, and a key co-operating therewith, said key having portions projecting different distances, each of said portions being adapted to engage a plurality of said disks when in one position and independent similar portions each adapted to engage a plurality of said disks when in another position, substantially as described.

3. A locking means of the character described, comprising permutation disks of successively differing diameters, and a key co-operating therewith, said key having portions projecting different distances adapted to engage the disks when in one position and independent similar portions adapted to engage the disks when in another position, substantially as described.

4. The combination with a steering wheel and a shaft having cooperating keyways, of a key slidable therein to operative and inoperative positions, and permutation disks of successively varying diameters surrounding the shaft and adapted to engage the key when in operative position to prevent movement therein to inoperative position, and to also engage said key when in inoperative position to prevent movement to operative position, substantially as described.

5. The combination with a steering wheel and shaft having cooperating keyways therein, of a key vertically slidable in said keyways to operative and inoperative positions, said key having a plurality of inclined portions projecting variable distances therefrom, and permutation disks having inclined portions arranged to engage certain of said portions to hold the key in operative position and other of said portions to hold the key in inoperative position, substantially as described.

6. A locking means of the character described, comprising a series of permutation disks of successively varying diameters, each having a peripheral notch therein, a key slidable through said notch when the disks are in predetermined position, and inclined portions on said key projecting varying distances therefrom arranged to engage said disks to prevent movement of the key when the disks are out of said predetermined positions, substantially as described.

7. A locking means of the character described, comprising a steering wheel shaft, a steering wheel loosely rotatable on said shaft, said steering wheel and shaft having cooperating keyways, a key slidable therein to operative and inoperative positions, said key having visible operating means whereby its position may be visually ascertained, and permutation disks adapted to engage the key when in operative position to prevent movement thereof to inoperative position, and to also engage said key when in inoperative position to prevent movement to operative position, substantially as described.

In testimony whereof, I have hereunto set my hand.

GEO. E. KNIGHT.